H. C. WILLIS.
TIRE ARMOR.
APPLICATION FILED MAY 18, 1910.
982,453.
Patented Jan. 24, 1911.
2 SHEETS—SHEET 1.
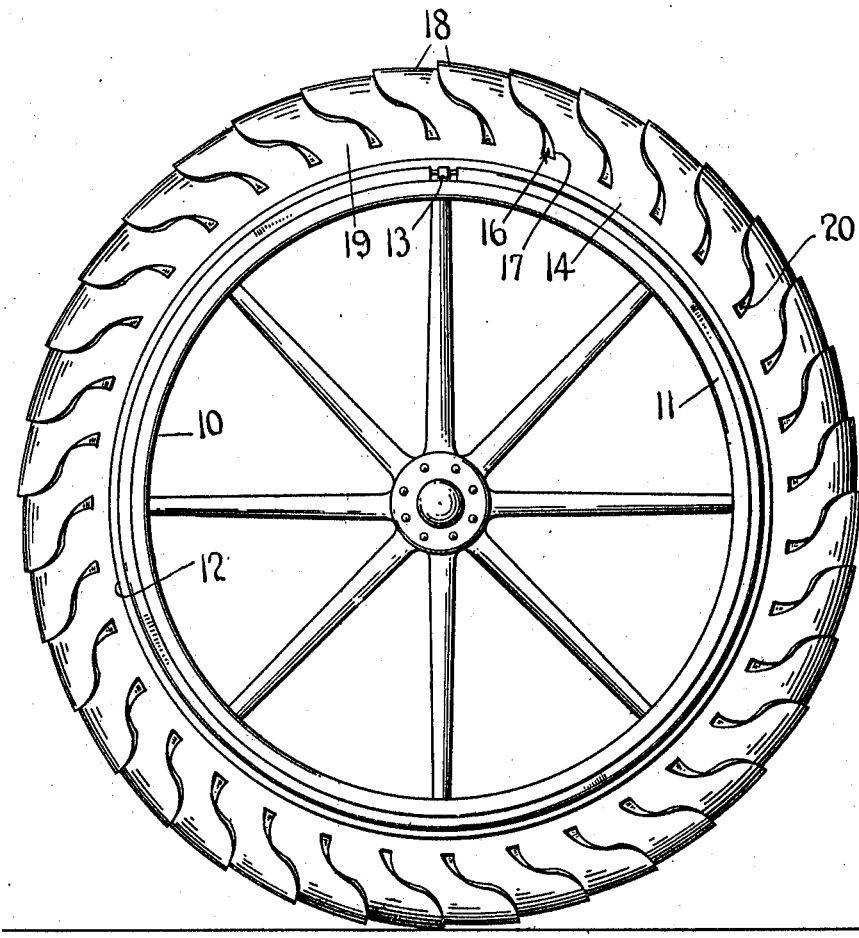
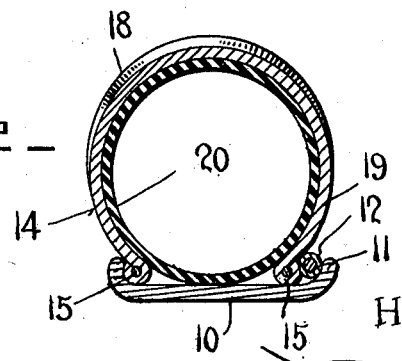
Witnesses
L. B. James
L. N. Gillis
Inventor
Horatio C. Willis
By
Attorneys

H. C. WILLIS.
TIRE ARMOR.
APPLICATION FILED MAY 18, 1910.

982,453.

Patented Jan. 24, 1911.
2 SHEETS—SHEET 2.

Witnesses
L. B. James
L. N. Willis

Inventor
Horatio C. Willis
By Chandler & Chandler
Attorneys

UNITED STATES PATENT OFFICE.

HORATIO C. WILLIS, OF WHITEWRIGHT, TEXAS.

TIRE-ARMOR.

982,453. Specification of Letters Patent. Patented Jan. 24, 1911.

Application filed May 18, 1910. Serial No. 561,997.

*To all whom it may concern:*

Be it known that I, HORATIO C. WILLIS, a citizen of the United States, residing at Whitewright, in the county of Grayson, State of Texas, have invented certain new and useful Improvements in Tire-Armors; and I do hereby declare the following to be a full, clear, and exact description of the invention, such as will enable others skilled in the art to which it appertains to make and use the same.

This invention relates to tires and has special reference to a tire or armor tire for inflatable rubber tires.

One object of the invention is to provide a metallic armor which will take the place of the heavy rubber tread commonly used outside of the ordinary inner tire.

Another object of the invention is to provide a resilient metallic tire of this description which may be made in a single piece and applied to a wheel in the manner common to ordinary outer tires.

With the above and other objects in view, the invention consists in general of a trough-shaped ring of resilient metal having a series of slits formed therein to provide a series of ground engaging tread members, the whole being of novel arrangement and construction.

The invention further consists in certain novel details of construction and combinations of parts hereinafter fully described, illustrated in the accompanying drawings, and specifically set forth in the claims.

Figure 3:
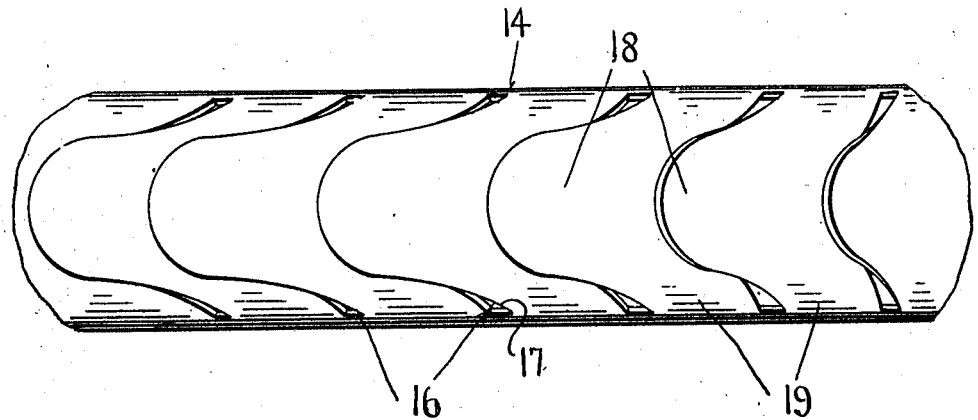
Figure 4:
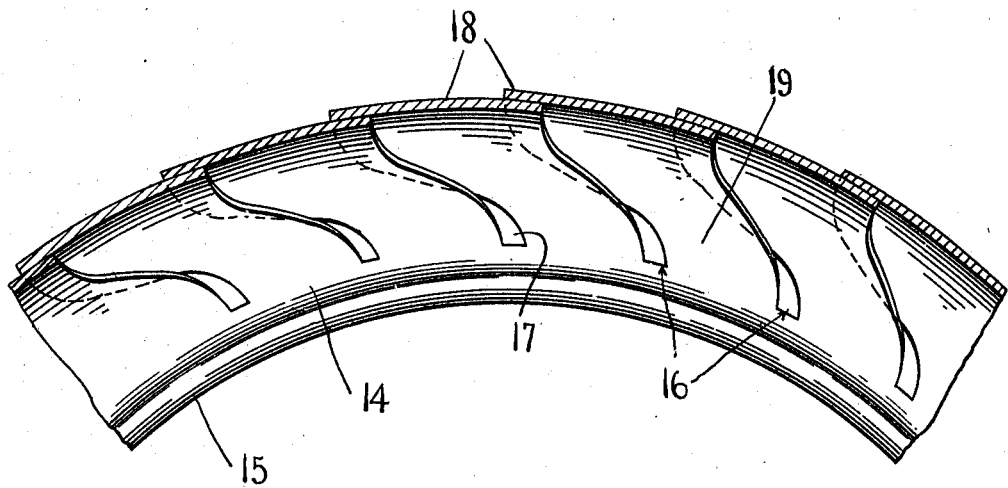

In the accompanying drawings, like characters of reference indicate like parts in the several views, and:—Figure 1 is a side elevation of a wheel equipped with this tire. Fig. 2 is a section through the wheel rim and tire. Fig. 3 is a face view of a portion of such a tire. Fig. 4 is a longitudinal section through a portion of such a tire.

The numeral 10 indicates the wheel rim and on this rim is supported the ordinary stationary ring 11 and removable ring 12, the latter being held in position by means of a tightener 13. Between the stationary ring 11 and removable ring 12 is held the tire which consists of a plate of resilient metal 14 bent to trough-shape and formed as an annulus as is the case with the ordinary tire. This plate 14 has beaded edges 15 which correspond to the beaded edges of the type of tire known as "clencher". These beaded edges serve to hold the tire in place by their engagement with the rings 11 and 12. The plate 14 is provided with a series of slits which extend diagonally of the trough from the center and terminate adjacent to but in spaced relation with the beaded edges 15. These slits are indicated at 16 and it is to be noted that the ends of these slits are widened as at 17 so that those portions of the plate left between the slits, preferably termed the tread members, each consists of a substantially lunate band joined to the body of the tire by means of narrow necks, the band being indicated at 18 and the necks at 19. After the plate 14 has been thus slit the central portions of the various tread members are drawn out laterally of these members so that one edge of each member overlaps the proximal edge of the next adjacent member while the remaining edge of said member underlies the proximal edge of the adjacent member of the other side. In order to have the metal of uniform thickness it is preferable that the plate be made thicker in the center before this drawing operation takes place so that after the tread members have been widened in this manner the thickness will be uniform throughout. When the tire has thus been formed the ends are brought together and connected by welding, soldering or in any other preferred manner.

Within this tire is held the inner tube 20 which is of any of the ordinary inflatable types. By means of the overlapping construction access to the inner tube is prevented with the consequence that the device is rendered puncture proof.

It is obvious that this tire might be used in connection with the ordinary shoe for the purpose of protecting the same although it is preferred to use the tire with the shoe omitted.

Having thus described the invention, what is claimed as new, is:—

1. In a device of the kind described, a metallic plate bent to form an arcuate trough, said trough being provided with spaced slits extending diagonally from the center and terminating short of the edges of said trough whereby is formed a series of ground engaging tread members, said members having their central portions drawn out to lengthen the said portions, whereby the proximal edges of adjacent tread members overlap.

2. A wheel tread comprising a band of metal of trough-shape provided with a continuous series of overlapping tread members integral with said band.

3. A wheel tread comprising a band of metal of trough-shape including a series of overlapping tread members integral with said band, said tread members extending transversely of said band with their central portions displaced longitudinally of the band with reference to their ends.

In testimony whereof, I affix my signature, in presence of two witnesses.

HORATIO C. WILLIS.

Witnesses:
 C. B. BRYANT,
 R. H. MAY.